(12) United States Patent
Chen et al.

(10) Patent No.: US 10,844,143 B2
(45) Date of Patent: Nov. 24, 2020

(54) MODIFIED RUBBER CONTAINING SILICON AND PHOSPHORUS, COMPOSITION AND MANUFACTURING METHOD THEREOF

(71) Applicant: TSRC Corporation, Kaohsiung (TW)

(72) Inventors: Chun-Lin Chen, Kaohsiung (TW); Yun-Ta Lee, Kaohsiung (TW); Adel Farhan Halasa, Akron, OH (US)

(73) Assignee: TSRC Corporation, Dashe Dist. (TW)

( * ) Notice: Subject to any disclaimer, the term of this patent is extended or adjusted under 35 U.S.C. 154(b) by 1 day.

(21) Appl. No.: 16/154,494

(22) Filed: Oct. 8, 2018

(65) Prior Publication Data

US 2019/0106511 A1 Apr. 11, 2019

Related U.S. Application Data

(60) Provisional application No. 62/569,385, filed on Oct. 6, 2017.

(51) Int. Cl.
| | | |
|---|---|---|
| *C08C 19/25* | (2006.01) | |
| *C08C 19/24* | (2006.01) | |
| *C08L 9/06* | (2006.01) | |
| *B60C 1/00* | (2006.01) | |
| *C08C 19/44* | (2006.01) | |
| *C08L 9/00* | (2006.01) | |
| C08K 5/09 | (2006.01) | |
| C08K 3/04 | (2006.01) | |
| C08K 3/36 | (2006.01) | |
| C08F 236/10 | (2006.01) | |

(52) U.S. Cl.
CPC ............. *C08C 19/25* (2013.01); *B60C 1/00* (2013.01); *B60C 1/0016* (2013.01); *C08C 19/24* (2013.01); *C08C 19/44* (2013.01); *C08L 9/00* (2013.01); *C08L 9/06* (2013.01); *C08F 236/10* (2013.01); C08K 3/04 (2013.01); C08K 3/36 (2013.01); C08K 5/09 (2013.01); C08L 2201/08 (2013.01)

(58) Field of Classification Search
CPC .................. C08C 19/24; C08C 19/25
See application file for complete search history.

(56) References Cited

U.S. PATENT DOCUMENTS

| | | | |
|---|---|---|---|
| 7,288,594 B2 | 10/2007 | Ozawa et al. | |
| 7,807,747 B2 | 10/2010 | Oshima | |
| 2007/0129465 A1* | 6/2007 | Baran, Jr. | ............ C08K 5/0066 523/200 |
| 2016/0152758 A1* | 6/2016 | Blok | ...................... B60C 1/0016 524/505 |
| 2016/0369015 A1* | 12/2016 | Doring | ..................... C08C 19/25 |
| 2018/0244809 A1 | 8/2018 | Yan | |

FOREIGN PATENT DOCUMENTS

| | | |
|---|---|---|
| CN | 1186360 C | 1/2005 |
| CN | 101157743 B | 11/2010 |
| JP | 5716736 B2 | 5/2015 |
| JP | 6229654 B2 | 11/2017 |
| WO | 2014133096 A1 | 2/2014 |
| WO | 2017042631 | 3/2017 |

OTHER PUBLICATIONS

JPO; Examination Report dated Sep. 5, 2019 in Patent Application No. 107135257.
TIPO Examination Report in the Taiwanese Patent Application No. 107135257.
Office Action in the Taiwanese Patent Application No. 107135257.

* cited by examiner

*Primary Examiner* — Marc S Zimmer
(74) *Attorney, Agent, or Firm* — Snell & Wilmer L.L.P.

(57) ABSTRACT

The present invention provides a modified rubber containing silicon and phosphorus, and a composition and manufacturing method thereof. The present invention provides the modified rubber structured as formula (1),

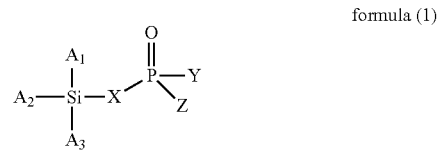

formula (1)

wherein X is selected from a $C_1$-$C_{12}$ alkylene group, a $C_2$-$C_{12}$ alkenylene group, a $C_3$-$C_{12}$ alicyclic group, and a $C_6$-$C_{12}$ aromatic group; and $A_1$, $A_2$, $A_3$, Y, and Z are each independently selected from an alkyl group, an alkoxy group, a halide group, and a conjugated diene rubber, wherein the conjugated diene rubber is a polymer composed of a conjugated diene monomer or the conjugated diene monomer with a vinyl aromatic monomer, $A_1$, $A_2$, $A_3$, Y, and Z are the same or different from each other, and at least one of $A_1$, $A_2$, $A_3$, Y, and Z is the conjugated diene rubber.

7 Claims, No Drawings

MODIFIED RUBBER CONTAINING SILICON AND PHOSPHORUS, COMPOSITION AND MANUFACTURING METHOD THEREOF

CROSS-REFERENCE TO RELATED APPLICATION

This application claims the right of priority based on U.S. Provisional Application No. 62/569,385 entitled "Modified Rubber Containing Si and P, Composition and Manufacturing Method Thereof," filed on Oct. 6, 2017, which is incorporated herein by reference and assigned to the assignee herein.

BACKGROUND OF THE INVENTION

Field of the Invention

The present invention relates to a modified conjugated diene rubber, a composition thereof, and a method for manufacturing the same, and more particularly to a modified conjugated diene rubber containing silicon atom and phosphorus atom.

Description of the Prior Art

Solution styrene butadiene rubber (SSBR) is a conjugated diene rubber composed of butadiene monomer and styrene monomers. Industrial production of the solution styrene butadiene rubber was first proposed by the U.S. Phillips company in batch process and Firestone company in continuous process. Since the solution styrene butadiene rubber is superior to the emulsion styrene butadiene rubber in mechanical properties and rolling resistance, the solution styrene butadiene rubber is widely used by the automotive industry and in other rubber products.

The conjugated diene rubber has low rolling resistance, excellent abrasion resistance, and excellent handling stability due to wet-skid resistance which increases the demand for it. On the other hand, the industry has proposed to add the silica compound or both the silica compound and carbon black to the rubber composition of the tire as the reinforcing agent. Tire treads containing silica compound or the mixture of silica compound and carbon black have low rolling resistance and wet-skid resistance, resulting in superior handling stability. In order to make the conjugated diene rubber more compatible with the reinforcing agent, many techniques for conjugated diene rubber have been proposed in the industry. U.S. Pat. No. 7,288,594 discloses the modification of lithium-containing styrene butadiene rubber in two stages with two different silane compounds. U.S. Pat. No. 7,807,747 discloses the modification of lithium-containing styrene butadiene rubber in two stages with the same silane compound. Japanese Patent No. JP5716736B2 discloses an isoprene rubber modified with an epoxy group or a siloxane group. Japanese Patent No. JP6229654B2 discloses a styrene butadiene rubber modified with a phosphino group-containing siloxane compound having trivalent phosphorus. Chinese Patent No. CN101157743B discloses a butadiene/isoprene/styrene rubber modified by a star seed tree coupling agent. Chinese Patent No. CN1186360C discloses a conjugated diene rubber formed by using an organic multilithium initiator.

However, the prior art inevitably has various problems, such as complicated process and is not easy to implement, or fails to effectively improve the storage stability of the modified conjugated diene rubber, or the performance is not superior enough, so the industry still needs a novel technique for the modification of the conjugated diene rubber to address the problems caused by the prior art.

SUMMARY OF THE INVENTION

In view of the above, the present invention provides a modified conjugated diene rubber containing silicon atom and phosphorus atom, wherein the modified conjugated diene rubber has a double bond connecting phosphorus and oxygen.

According to one embodiment, the present invention provides a modified rubber having a structure of formula (1):

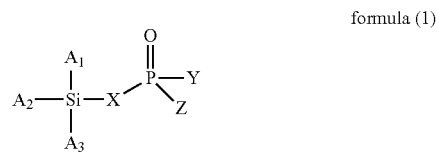

formula (1)

wherein X is selected from a $C_1$-$C_{12}$ alkylene group, a $C_2$-$C_{12}$ alkenylene group, a $C_3$-$C_{12}$ alicyclic group, and a $C_6$-$C_{12}$ aromatic group; and $A_1$, $A_2$, $A_3$, Y, and Z are each independently selected from an alkyl group, an alkoxy group, a halide group, and a conjugated diene rubber, wherein the conjugated diene rubber is a polymer composed of a conjugated diene monomer or the conjugated diene monomer with a vinyl aromatic monomer, $A_1$, $A_2$, $A_3$, Y, and Z are the same or different from each other, and at least one of $A_1$, $A_2$, $A_3$, Y, and Z is the conjugated diene rubber.

According to one embodiment, the present invention provides the modified rubber as above, wherein the conjugated diene rubber is a homopolymer or a copolymer, wherein the copolymer is a block copolymer or a non-block copolymer. The block copolymer of the present invention comprises at least two blocks. Any block of the block copolymer may be selected from a homopolymer block composed of a single type of monomer or a copolymer block composed of at least two types of monomers wherein the copolymer block may be a disordered-typed (random-typed) block or a tapered-typed block formed by the at least two types of monomers.

According to one embodiment, the present invention provides the modified rubber as above, wherein the conjugated diene rubber is a non-block copolymer. The non-block copolymer is composed of the at least two types of monomers in disordered (random) or tapered arrangement.

According to one embodiment, the present invention provides the modified rubber as above, wherein the conjugated diene rubber is a block copolymer comprising at least one homopolymer block and at least one copolymer block.

According to one embodiment, the present invention provides the modified rubber as above, wherein at least two of $A_1$, $A_2$, $A_3$, Y, and Z are the conjugated diene rubber.

According to one embodiment, the present invention provides the modified rubber as above, wherein by a gel permeation chromatography (GPC) measurement the modified rubber is characterized in having m peaks, m is greater than or equal to 1, the first peak ($M_i$) represents the lowest weight average molecular weight, and $M_i$ ranges from $5 \times 10^4$ to $150 \times 10^4$ g/mole, preferably from $10 \times 10^4$ to $150 \times 10^4$ g/mole, or more preferably from $15 \times 10^4$ to $150 \times 10^4$ g/mole.

According to one embodiment, the present invention provides the modified rubber as above, wherein m is greater than 1, the modified rubber has a coupling ratio (CR %) of 10% to 80%, preferably 20% to 75%, or more preferably 30% to 70%, and the coupling ratio (CR %)=[(a total integral area of the m peaks−an integral area of the first peak)/the total integral area of the m peaks]×100%.

In another aspect of the present invention, the present invention provides a method for manufacturing a modified rubber, comprising: step (a): providing a conjugated diene rubber, which is a polymer composed of a conjugated diene monomer or the conjugated diene monomer with a vinyl aromatic monomer; and step (b): providing a compound containing silicon and phosphorus to react with the conjugated diene rubber, wherein the compound containing silicon and phosphorus has a structure of formula (1), and the conjugated diene rubber replaces at least one of $A_1$, $A_2$, $A_3$, Y, and Z in the compound containing silicon and phosphorus to form the modified rubber,

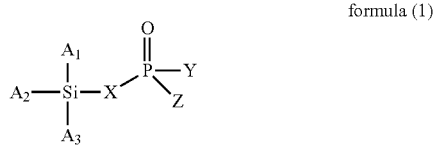

formula (1)

wherein X is selected from a $C_1$-$C_{12}$ alkylene group, a $C_2$-$C_{12}$ alkenylene group, a $C_3$-$C_{12}$ alicyclic group, and a $C_6$-$C_{12}$ aromatic group; and $A_1$, $A_2$, $A_3$, Y, and Z are each independently selected from an alkyl group, an alkoxy group, and a halide group, and $A_1$, $A_2$, $A_3$, Y, and Z are the same or different from each other.

In one embodiment, the present invention provides the method for manufacturing the modified rubber as above, wherein the conjugated diene rubber is a block copolymer.

In one embodiment, the present invention provides the method for manufacturing the modified rubber as above, wherein the conjugated diene rubber is a non-block copolymer.

According to one embodiment, the present invention provides the method for manufacturing the modified rubber as above, wherein the block copolymer comprises at least one homopolymer block and at least one copolymer block.

In one embodiment, the present invention provides the method for manufacturing the modified rubber as above, wherein the conjugated diene rubber replaces at least two of $A_1$, $A_2$, $A_3$, Y, and Z in the compound containing silicon and phosphorus to form the modified rubber.

In one embodiment, the present invention provides the method for manufacturing the modified rubber as above, wherein by a gel permeation chromatography (GPC) measurement the modified rubber is characterized in having m peaks, m is greater than or equal to 1, and the first peak ($M_i$) represents the lowest weight average molecular weight of $5\times10^4$ to $150\times10^4$ g/mole, preferably $10\times10^4$ to $150\times10^4$ g/mole, or more preferably $15\times10^4$ to $150\times10^4$ g/mole.

In one embodiment, the present invention provides the method for manufacturing the modified rubber as above, wherein m is greater than 1, the modified rubber has a coupling ratio (CR %) of 10% to 80%, 20% to 75%, or 30% to 70%, and the coupling ratio (CR %)=[(a total integral area of the m peaks−an integral area of the first peak)/the total integral area of the m peaks]×100%.

In one embodiment, the present invention provides the method for manufacturing the modified rubber as above, wherein the modified rubber has a weight average molecular weight (Mw) of $15\times10^4$ to $200\times10^4$ g/mole, preferably $20\times10^4$ to $180\times10^4$ g/mole, or more preferably $25\times10^4$ to $180\times10^4$ g/mole.

The present invention provides modified rubbers produced by the methods as above.

According to one embodiment, the present invention provides a rubber composition comprising the modified rubbers as above.

According to one embodiment, the present invention provides a rubber composition as above, further comprising at least one of silicon oxide, filling oil, antioxidant, stearic acid, wax, vulcanization accelerator, processing accelerator, and carbon black.

In still another aspect, the present invention provides a rubber composition, comprising a conjugated diene rubber composed of a conjugated diene monomer or the conjugated diene monomer with a vinyl aromatic monomer; and a compound containing silicon and phosphorus and having a structure of formula (1),

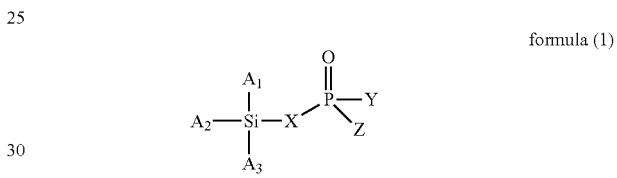

formula (1)

wherein X is selected from a $C_1$-$C_{12}$ alkylene group, a $C_2$-$C_{12}$ alkenylene group, a $C_3$-$C_{12}$ alicyclic group, and a $C_6$-$C_{12}$ aromatic group; and $A_1$, $A_2$, $A_3$, Y, and Z are each independently selected from an alkyl group, an alkoxy group, and a halide group, and $A_1$, $A_2$, $A_3$, Y, and Z are the same or different from each other.

According to one embodiment, the present invention provides a rubber composition as above, wherein the conjugated diene rubber is a block copolymer.

According to one embodiment, the present invention provides the rubber composition as above, wherein the conjugated diene rubber is a non-block copolymer.

According to one embodiment, the present invention provides the rubber composition as above, wherein the block copolymer comprises at least one homopolymer block and at least one copolymer block.

According to one embodiment, the present invention provides a rubber composition as above, further comprising at least one of silicon oxide, filling oil, antioxidant, stearic acid, wax, vulcanization accelerator, processing accelerator, and carbon black.

DETAILED DESCRIPTION OF THE EMBODIMENTS

The preferred embodiments of the present invention are exemplified below in order to have the invention and the scope of the claims be fully understood. To avoid obscuring the content of the present invention, the following description may omit conventional components, related materials, and related processing techniques.

Analysis Method

Regarding the molar ratio of the modifier to the conjugated diene rubber containing alkali metal ions, the number of mole of the modifier is A, the number of mole of the conjugated diene rubber containing alkali metal ions is B, and the molar ratio of the modifier to the conjugated diene rubber containing alkali metal ions=(A/B)×100%, wherein A=(the weight of the modifier)/(the molecular weight of the modifier), and B=(the total weight of monomers added to the reaction)/(the weight average molecular weight of the first peak ($M_i$) of the modified conjugated diene rubber obtained by gel permeation chromatography (GPC), wherein the first peak ($M_i$) represents the lowest weight average molecular weight of the modified conjugated diene rubber.

The weight average molecular weight (Mw) and the molecular weight distribution (MWD) are analyzed by Gel Permeation Chromatography (GPC), using Waters 1525 Binary HPLC Pump, wherein the detector is Waters 2414 Refractive Index Detector, the eluent is tetrahydrofuran, and the eluent flow rate is 1 ml/min.

Regarding the coupling ratio (CR %), the coupling ratio= [(the total integral area of m peaks−the integral area of the first peak)/the total integral area of the m peaks]×100%, wherein the modified rubber is characterized in having m peaks, which are measured by gel permeation chromatography (GPC) and at the time of measurement, tetrahydrofuran is used as the mobile phase.

Mooney Viscosity (ML) is measured using ALPHA Mooney MV 2000 according to the ASTM D-1646 test method.

Glass Transition Temperature (Tg, ° C.) of the polymer is measured by Differential Scanning calorimeter (DSC), where in TA Instrument Q200 differential scanning colorimeter is used with a scanning rate of 20° C./min and a scanning range of −90° C. to 100° C. under nitrogen atmosphere.

Tensile Strength at Break (Tb, Mpa) is measured using the INSTRON 33R4464 model according to the ASTM D412 standard.

Elongation at break (Eb, %) is measured using the INSTRON 33R4464 model according to the ASTM D412 standard.

Dynamic loss tangent tan δ 60° C. is used to determine the rolling resistance of the rubber material after being made into the tread rubber, which can be measured in two ways using the TA instrument ARES-G2 model. In the way of A under strain sweep, the variations of G' and G" of the test piece are measured to obtain the value of tan δ=G"/G'. The temperature of the sample during scanning is 60° C., the strain sweep range is 0.1% to 10%, the scanning frequency is 1 Hz, and the strain value of 5.0% is taken. The way of B uses temperature sweep with a sweep range of −70° C. to 80° C., wherein the sweep ranged from −70° C. to 30° C. uses a strain measurement of 0.2% and the scanning frequency is 1 Hz, and the sweep ranged from 30° C. to 80° C. uses a strain measurement of 3.0% and the scanning frequency is 1 Hz. The variations of G' and G" of the test piece are measured to obtain the value of tan δ=G"/G' at 60° C.

Step (a) Polymerization Reaction

The method for manufacturing a modified rubber according to the present invention comprises the step (a): providing a conjugated diene rubber, which is a polymer composed of a conjugated diene monomer or the conjugated diene monomer with a vinyl aromatic monomer. The conjugated diene rubber can be formed by various suitable methods. The present invention preferably utilizes an anionic polymerization method to polymerize the conjugated diene monomer or the conjugated diene monomer with the vinyl aromatic monomer using an organic alkali metal compound as an initiator to form a conjugated diene rubber containing alkali metal ions.

The polymer of the present invention may be a polymer of a conjugated diene monomer, or a copolymer of a conjugated diene monomer (such as butadiene or isoprene) and a vinyl aromatic monomer (such as styrene or methyl styrene). The polymerizable monomer of the conjugated diene rubber of the present invention is not limited to 1,3-butadiene, isoprene and styrene, and any suitable derivatives of those described above may be used in the present invention. For example, the conjugated diene monomer suitable for use in the present invention may be a conjugated diene having 4 to 12 carbon atoms, and specific examples thereof include 1,3-butadiene, isoprene, 2,3-dimethyl-1,3-butadiene, 2-phenyl-1,3-butadiene, 1,3-pentadiene, 2-methyl-1,3-pentadiene, 3-methyl-1,3-pentadiene, 1,3-hexadiene, 1,3-heptadiene, 4,5-diethyl-1,3-octadiene, 3-butyl-1,3-octadiene, 1-methylbutadiene, 2-phenyl-1,3-butadiene, 2-chloro-1,3-butadiene, and any combination thereof, among which 1,3-butadiene, isoprene, or 2,3-dimethyl-1,3-butadiene is the preferred choice. Specific examples of the vinyl aromatic monomer suitable for use in the present invention include styrene, methylstyrene and all isomers thereof, ethylstyrene and all isomers thereof, tert-butyl styrene and all isomers thereof, cyclohexylstyrene, vinylbiphenyl, 1-vinyl-5-hexylnaphthalene, vinylnaphthalene, vinylanthracene, 2, 4-dimethylstyrene, 2,4-diisopropylstyrene, 5-tert-butyl-2-methylstyrene, divinylbenzene, trivinylbenzene, divinylnaphthalene, tert-butoxystyrene, N-(4-vinylbenzyl)-N,N-dimethylamine, 4-vinylbenzyl 2-(dimethylamino)ethyl ether, N,N-dimethylaminoethylstyrene, N,N-dimethylaminomethylstyrene, vinylpyridine, diphenylethylene, diphenylethylene containing tertiary amino groups, such as 1-(4-N,N-dimethylaminophenyl)-1-phenylethylene, and any combinations thereof. Among those described above, styrene or methyl styrene is the preferred choice.

The types of the alkali-metal-organics are preferably, for example, an organolithium compound, an organosodium compound, and an organomagnesium compound. An example of the organosodium compound is sodium naphthalene, and an example of the organomagnesium compound is dibutyl magnesium. The organolithium compound includes all organolithium compounds having a polymerization initiating ability, including the low molecular weight organolithium compound, the organolithium compound having one lithium in one molecule or a plurality of lithium in one molecule, the organolithium compound having a carbon-lithium bond, a nitrogen-lithium bond, or a tin-lithium bond at the bond connecting the organic group and lithium. Specific examples include n-propyllithium, isopropyllithium, n-butyllithium, sec-butyllithium, tert-butyllithium, n-pentyllithium, n-hexyllithium, phenyllithium, tolyllithium, benzyllithium, lithium naphthalene and lithium stilbene, etc. The multifunctional organolithium compound is, for example, 1,4-dilithium butane, the reaction product of sec-butyllithium with diisopropenylbenzene, 1,3,5-trilithium benzene, the reaction product of n-butyllithium with 1,3-butadiene and divinylbenzene, and the reaction product of n-butyllithium and a polyacetylene compound; the compound having a nitrogen-lithium bond, such as lithium dimethylamide, lithium dihexylamide, lithium diisopropylamide, and lithium hexamethyleneimine. Among those described above, n-butyllithium and sec-butyllithium are preferred.

The solvent suitable for the polymerization reaction is, for example, an inert organic solvent, which does not participate in the polymerization reaction. Such solvent comprises the aliphatic hydrocarbons, e.g., butane, isobutane, n-pentane, isopentane, 2,2,4-trimethylpentane, isohexane, n-hexane, isoheptane, n-heptane, isooctane, n-octane; the cycloalkanes, like cyclohexane, methylcyclohexane, ethylcyclohexane, cyclopentane, cycloheptane, or methylcyclopentane; and aromatic hydrocarbons, such as benzene, toluene, xylene, ethylbenzene, diethylbenzene, or propylbenzene. What is suitable for use in the present invention is preferably cyclohexane. In general, if an inert organic solvent is used as a solvent alone, the polymerization reactivity of the vinyl aromatic monomer and the conjugated diene monomer is quite different, and this can be overcome by adding a polar solvent. Specific examples of the polar solvent suitable for use in the present invention include ether compounds, such as tetrahydrofuran, diethyl ether, cyclopentyl ether, dipropyl ether, ethylene glycol dimethyl ether, ethylene glycol diethyl ether, diethylene glycol, dimethyl ether, methyl ethyl ether, etc. and N,N,N',N'-tetramethylethylenediamine, among which tetrahydrofuran, diethyl ether, ethylene glycol dimethyl ether, and ethylene glycol diethyl ether are preferred.

The initial temperature of polymerization can be from 10° C. to 80° C., and the final temperature can be from 30° C. to 150° C. The temperature control method can use adiabatic reaction mode, thermostatic control, or partial cooling mode. The level of the initial temperature will affect the level of the glass transition temperature (Tg) of the conjugated diene rubber, and the lowering of the initial temperature results in a conjugated diene rubber with a higher glass transition temperature (Tg).

The unmodified conjugated diene rubber may be a homopolymer or a copolymer, wherein the copolymer may be a block copolymer or a non-block copolymer. The polymers described above may be formed using various suitable methods known in the art. For example, the non-block copolymer may be prepared by simultaneously charging a plurality of monomers into a reactor and then adding an initiator, with optionally mixing of the cyclic ether and/or the diether for polymerization. The block copolymer can be prepared by adding different kinds of monomers to the reactor by various ratios and different stages. According to various embodiments of the present invention, the initial weight average molecular weight ($M_i$) of the polymer after completion of the polymerization but not yet reacted with the modifier is preferably $5 \times 10^4$ to $150 \times 10^4$ g/mole, more preferably $10 \times 10^4$ to $150 \times 10^4$ g/mole, or particularly preferably $15 \times 10^4$ to $150 \times 10^4$ g/mole. The weight average molecular weight (Mw) of the polymer after modification is preferably $15 \times 10^4$ to $200 \times 10^4$ g/mole, more preferably $20 \times 10^4$ to $180 \times 10^4$ g/mole, or particularly preferably $25 \times 10^4$ to $180 \times 10^4$ g/mole. The initial weight average molecular weight ($M_i$) of the polymer decreases as the added amount of the initiator increases. The weight average molecular weight (Mw) of the modified rubber decreases as the amount of the modifier added increases.

Step (b) Modification Reaction

The method for manufacturing a modified rubber according to the present invention comprises the step (b): providing a compound containing silicon and phosphorus to react with the conjugated diene rubber, wherein the compound containing silicon and phosphorus has a structure of formula (1):

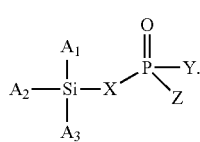

formula (1)

In formula (1), X is selected from $C_1$-$C_{12}$ alkylene group, $C_2$-$C_{12}$ alkenylene group, $C_3$-$C_{12}$ alicyclic group, and $C_6$-$C_{12}$ aromatic group; and $A_1$, $A_2$, $A_3$, Y and Z are each independently selected from an alkyl group, an alkoxy group, and a halide group, and $A_1$, $A_2$, $A_3$, Y, and Z are the same or different from each other.

When X is a $C_1$-$C_{12}$ alkylene group, examples of the $C_1$-$C_{12}$ alkylene group are the methylene, ethylene, propylene, and butylene groups. When X is a $C_2$-$C_{12}$ alkenylene group, examples of the $C_2$-$C_{12}$ alkenylene group are the ethenylene, propenylene, butenylene, and hexenylene groups. When X is a $C_3$-$C_{12}$ alicyclic group, examples of the $C_3$-$C_{12}$ alicyclic group are the cyclopropyl, cyclobutyl, cyclopentyl, cyclohexyl, and cycloheptyl groups. When X is a $C_6$-$C_{12}$ aromatic group, examples of the $C_6$-$C_{12}$ aromatic group are the phenyl, tolyl, ethylphenyl, xylyl, and propylphenyl groups.

When $A_1$, $A_2$, $A_3$, Y and Z are each independently an alkyl group, examples of the alkyl group are methyl, ethyl, propyl, isopropyl, n-butyl, isobutyl, tert-butyl, hexyl, and 2-ethylhexyl. When $A_1$, $A_2$, $A_3$, Y and Z are each independently an alkoxy group, examples of the alkoxy group are methoxy, ethoxy, propoxy, butoxy, sec-butoxy, and tert-butoxy. When $A_1$, $A_2$, $A_3$, Y and Z are each independently a halide group, examples of the halide group are fluorine, chlorine, bromine, iodine, and an alkyl group containing fluorine, chlorine, bromine, or iodine.

Specific examples of the compound containing silicon and phosphorus used in the present invention include, but are not limited to, the following structures: diethyl [2-(triethoxysilyl)ethyl] phosphonate dimethyl [3-(trimethoxysilyl)propyl] phosphonate, diethyl [3-(triethoxysilyl)propyl]phosphonate, diethyl (triethoxysilyl)methylphosphonate, diethyl [4-(triethoxysilyl)butyl]phosphonate, dipropyl [3-(tripropoxysilyl)propyl]phosphonate, dimethyl [3-(dimethoxy(methyl)silyl)propyl]phosphonate, diethyl [3-(diethoxy(methyl)silyl)propyl]phosphonate, methyl methyl[3-(dimethoxy(methyl)silyl)propyl]phosphonate, and ethyl methyl [3-(diethoxy(methyl)silyl)propyl]phosphonate. The above mentioned are phosphonates having pentavalent phosphorus.

In step (b), at least one of $A_1$, $A_2$, $A_3$, Y, and Z in the compound containing silicon and phosphorus is substituted by the conjugated diene rubber to form the modified rubber. In some embodiments, one of them is substituted, or preferably two of them are substituted, or more preferably more than two of them are substituted. The compound containing silicon and phosphorus is referred to as a modifier. The molar ratio of the modifier to the conjugated diene rubber containing alkali metal ions is ≥0.01, preferably ≥1.0, and more preferably ≥5.0.

Stripping and Drying

The modified rubber or the unmodified conjugated diene rubber may be subjected to steam stripping as needed. The steam stripping method is that the temperature is controlled at 150° C. and the pH can be between 4 and 12. After the steam stripping or devolatilization (Devol) for the abovementioned rubber, the solvent can be removed by vaccum, hot air, or other heat source, and then subjected to a well-known drying treatment, such as mechanical dehydration, oven drying, or apron drying. Or, for example, the rubber is subjected to hot roll drying at 110° C. The coupling ratio of the modified rubber of the present invention after the above stripping and drying treatment is preferably 10% to 80%, more preferably is 20% to 75%, and particularly preferably is 30% to 70%. The coupling ratio decreases as the added amount of modifier increases.

Modified Rubber

After the above modification reaction, a modified rubber having the following structure can be formed:

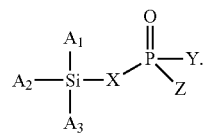

formula (1)

wherein X is selected from a $C_1$-$C_{12}$ alkylene group, a $C_2$-$C_{12}$ alkenylene group, a $C_3$-$C_{12}$ alicyclic group, and a $C_6$-$C_{12}$ aromatic group; and $A_1$, $A_2$, $A_3$, Y, and Z are each independently selected from an alkyl group, an alkoxy group, a halide group, and a conjugated diene rubber, wherein the conjugated diene rubber is a polymer composed of a conjugated diene monomer or the conjugated diene monomer with a vinyl aromatic monomer, $A_1$, $A_2$, $A_3$, Y, and Z are the same or different from each other, and at least one of $A_1$, $A_2$, $A_3$, Y, and Z is the conjugated diene rubber. Examples of the groups of X, $A_1$, $A_2$, $A_3$, Y and Z can be referred to the preceding paragraph. After the modification reaction, the weight average molecular weight (Mw) of the modified rubber formed is preferably $15 \times 10^4$ to $200 \times 10^4$ g/mole, more preferably $20 \times 10^4$ to $180 \times 10^4$ g/mole, and particularly preferably $25 \times 10^4$ to $180 \times 10^4$ g/mole.

The Mooney viscosity (ML) of a polymer is affected by the initial weight average molecular weight ($M_i$) or the coupling ratio (CR %) of the polymer.

Rubber Composition

There are at least two kinds of rubber compositions in the present invention, wherein one is a rubber composition obtained by mixing the above-described modified rubber with other components, and the other is a rubber composition obtained by mixing the above-mentioned unmodified conjugated diene rubber with the compound containing silicon and phosphorus, and optionally adding other components.

Examples of other components include various known rubbers, such as styrene butadiene rubber (SBR), polybutadiene rubber (BR), butadiene-isoprene copolymer rubber, polyisoprene rubber (IR), and butyl rubber (IIR). Specific examples further include natural rubber, ethylene-propylene copolymer rubber, and ethylene-octene copolymer rubber. The above components may be used in a mixture of two or more components. The composition of the rubber composition of the present invention may be such that when the total amount of all the rubber components is 100 parts by weight, the content of the modified rubber or the unmodified rubber of the present invention is preferably at least 10 parts by weight, and more preferably at least 20 parts by weight.

Further, the rubber composition of the present invention may also contain an additive. Specific examples of the additive are a vulcanizing agent, such as sulfur; a vulcanization accelerator, such as a thiazole-based vulcanization accelerator, a thiuram-based vulcanization accelerator, or a sulfenamide-based vulcanization accelerator; a vulcanization activator, such as stearic acid or zinc oxide; an organic peroxide; a reinforcing agent, such as silica compound (silicon dioxide) or carbon black; a filler such as calcium carbonate or talc; a silane coupling agent; a filling oil; a processing aid; an antioxidant; a wax; and a lubricant.

In the example in which the silica compound is used as a reinforcing agent to be blended into the rubber composition of the present invention, when the total amount of all the rubber components is 100 parts by weight, the content of the silica compound is usually from 10 parts by weight to 200 parts by weight. From the standpoint of fuel economy, the amount of the silica compound to be mixed is preferably at least 20 parts by weight or more preferably at least 30 parts by weight. From the viewpoint of the reinforcing effect, it is preferably not more than 180 parts by weight or more preferably not more than 150 parts by weight. The silica compound can be amorphous synthetic silica compound obtained, for example, by acidification of a soluble silicate (such as sodium silicate or co-precipitation of silicate with aluminate). In general, such precipitated silica compound is well known to those of ordinary skill in the art. The BET specific surface area of the synthetic silica compound (precipitated silica compound), as measured by nitrogen, may be, for example, between about 50 and about 300 $m^2/g$, and alternatively may range from about 100 to about 250 $m^2/g$. The silica compound may also have a dibutyl phthalate absorption value, for example, ranging from about 100 cc/g to about 500 cc/g, preferably ranging from about 120 cc/g to about 350 cc/g. Other commercially available synthetic silica compounds are contemplated for use in the present invention, including but not limited to, the commercially available silica compounds supplied by PPG Industries, such as Models 210, 243 under the trademark Hi-Sil, etc.; the commercially available silica compounds supplied by Rhodia Corporation, such as the product models Zeosil 1165 MP and Zeosil 165GR; the commercially available silica compounds supplied by EVONIK Corporation, such as the product models VN2, VN3, 7000GR, and 9000GR; and the commercially available silica compounds supplied by Huber, such as the product models Zeopol 8745.

In the example in which non-silica compound is used as a reinforcing agent to be blended into the conjugated diene rubber composition of the present invention, from the viewpoint of the reinforcing effect, when the total amount of all the rubber components is 100 parts by weight, the content of the non-silica compound reinforcing agent is preferably not more than 120 parts by weight or more preferably not more than 100 parts by weight. From the viewpoint of fuel economy, it is preferably at least 1 part by weight or more preferably at least 3 parts by weight. A preferred non-silica compound reinforcing agent is carbon black.

The mixing method of the rubber composition of the present invention can use, for example, a conventional mixer, such as a roll miller, or a banbury mixer, or brabender, or extruder, or kneader, or an internal mixer for kneading various components. Regarding the conditions of the mixing, in addition to the vulcanizing agent or the vulcanization accelerator, when the additive, the filler, silica compound and/or other reinforcing agents are mixed, the processing temperature is usually from 50° C. to 200° C., preferably from 80° C. to 150° C. with two to three stages of mixing and usually 30 seconds to 20 minutes, preferably 1 minute to 10 minutes of processing time. When the vulcanizing agent or the vulcanization accelerator is mixed, the processing temperature is usually not more than 100° C., preferably from room temperature to 90° C. The composition mixed with the vulcanizing agent or the vulcanization accelerator can be prepared by a vulcanization treatment, such as press vulcanization. The temperature of the vulcanization treatment is usually from 120° C. to 200° C., preferably from 140° C. to 180° C.

The modified rubber of the present invention and the conjugated diene rubber composition thereof can be used for tires, soles, flooring materials, vibration blocking materials, etc., and are particularly suitable for use in tires to improve the low rolling resistance of the tire tread and to promote the wet-skid resistance, resulting in handling stability and reliability.

The processes of the polymerization reaction and the modification reaction of the present invention will be described in detail by way of examples below.

Example 1A

An autoclave reactor was provided with a capacity of 10 liters filled with nitrogen. 5525 g of cyclohexane, 10 g of tetrahydrofuran, 1.66 g of ethylene glycol diethyl ether, 45 g of isoprene, 621 g of 1,3-butadiene, and 200.6 g of styrene were charged into the autoclave reactor. When the temperature of the reactor content reached 30° C., 10.2 g (8.06 mmole) of 5 wt % n-butyl lithium was added to initiate the polymerization reaction. The polymerization reaction was carried out under adiabatic conditions with a maximum temperature of 64° C. When the polymerization reaction was almost completed, 33 g of 1,3-butadiene was added and further polymerization was carried out for about 5 minutes. Then, 7.0 g (21.3 mmole) of diethyl [2-(triethoxysilyl)ethyl]phosphonate (hereinafter referred to as Modifier 1) was added to carry out the reaction for about 20 minutes, and the molar ratio of the modifier/conjugated diene rubber-lithium (the molar ratio of the modifier to the conjugated diene rubber containing alkali metal ions) was 5.6. Next, methanol was added to the polymer solution to terminate the reaction. Afterwards, the polymer solution was subjected to stripping and drying to obtain the modified rubber of Example 1A.

Example 1B

An autoclave reactor was provided with a capacity of 10 liters filled with nitrogen. 5525 g of cyclohexane, 10 g of tetrahydrofuran, and 2.1 g of ethylene glycol diethyl ether were charged into the autoclave reactor, and 45 g of isoprene was added. When the temperature of the reactor contents reached 30° C., 9.6 g (7.66 mmole) of 5 wt % n-butyl lithium was added to initiate the polymerization reaction. The polymerization reaction was carried out under adiabatic conditions. 621 g of 1,3-butadiene and 200.6 g of styrene were further added to the autoclave reactor. When the polymerization reaction was almost completed, the maximum temperature is 66° C., and 33 g of 1,3-butadiene was added to carry out further polymerization for about 5 minutes. Then, 1.73 g (5.26 mmole) of Modifier 1 was added to carry out the reaction for about 20 minutes, and the molar ratio of the modifier/conjugated diene rubber-lithium (the molar ratio of the modifier to the conjugated diene rubber containing alkali metal ions) was 1.6. Next, methanol was added to the polymer solution to terminate the reaction. Afterwards, the polymer solution was subjected to stripping and drying to obtain the modified rubber of Example 1B.

Example 2

An autoclave reactor was provided with a capacity of 10 liters filled with nitrogen. 5525 g of cyclohexane, 10 g of tetrahydrofuran, and 2.1 g of ethylene glycol diethyl ether were charged into the autoclave reactor, and 621 g of 1,3-butadiene and 200.6 g of styrene were added. When the temperature of the reactor contents reached 30° C., 9.6 g (7.66 mmole) of 5 wt % n-butyl lithium was added to initiate the polymerization reaction. The polymerization reaction was carried out under adiabatic conditions with a maximum temperature of 68° C. When the polymerization reaction was almost completed, 33 g of 1,3-butadiene was added and further polymerization was carried out for about 5 minutes. Then, 1.59 g (4.84 mmole) of Modifier 1 was added to carry out the reaction for about 20 minutes, and the molar ratio of the modifier/conjugated diene rubber-lithium (the molar ratio of the modifier to the conjugated diene rubber containing alkali metal ions) was 1.4. Next, methanol was added to the polymer solution to terminate the reaction. Afterwards, the polymer solution was subjected to stripping and drying to obtain the modified rubber of Example 2.

Example 3

The procedure of Example 3 can be referred to the procedure of Example 2, which uses the same solvent and reactants, and the reaction conditions differ in the molar ratio of the modifier to the conjugated diene rubber containing alkali metal ions, as shown in Table 1.

Example 4 to Example 5

The procedures of Example 4 to Example 5 can be referred to the procedure of Example 2, which used the same solvent and reactants, and the reaction conditions differ in the molar ratio of the modifier to the conjugated diene rubber containing alkali metal ions, as shown in Table 1, and also differ in the increase of the added amount of the polar solvent and the decrease of the initial temperature, by which the conjugated diene rubber with higher glass transition temperature (Tg) was obtained.

Example 6 to Example 7

The procedures of Example 6 to Example 7 can be referred to the procedure of Example 2, wherein the differences are the type of the modifier and the molar ratio of the modifier to the conjugated diene rubber containing alkali metal ions, as shown in Table 1. The modifier used in Example 6 to Example 7 was diethyl [3-(triethoxysilyl)propyl]phosphonate (hereinafter referred to as Modifier 2).

The specification information of the modified rubbers of Examples 2 to 7 can be seen in Table 2 and Table 3.

Comparative Example 1 to Comparative Example 7 (Rubber modified without the compound containing silicon and phosphorus), Comparative Example 8 (unmodified rubber).

The procedures of Comparative Example 1 to Comparative Example 8 can be referred to the procedure of Example 2, wherein the differences are that the modifier type is not a compound containing silicon and phosphorus or no use of modifier and the molar ratio of the modifier to the conjugated diene rubber containing alkali metal ions. The comparative Example 8 in which no modifier was added is an unmodified rubber. The modifier type and the molar ratio of the modifier to the conjugated diene rubber containing alkali metal ions can be seen in Table 1. The specification information of the modified rubber of Comparative Example 1 to Comparative Example 7 and the unmodified rubber of Comparative Example 8 can be seen in Tables 2 and 3.

TABLE 1

| Condition | Example 2 | Example 3 | Example 4 | Example 5 | Example 6 | Example 7 |
|---|---|---|---|---|---|---|
| Modifier | Modifier 1 | Modifier 1 | Modifier 1 | Modifier 1 | Modifier 2 | Modifier 2 |
| Modifier/Conjugated diene rubber-lithium (molar ratio) | 1.4 | 2.2 | 1.6 | 5.6 | 1.6 | 5.6 |

| Condition | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Modifier | Modifier 3 | Modifier 4 | Modifier 4 | Modifier 5 | Modifier 5 | Modifier 6 | Modifier 6 | None |
| Modifier/Conjugated diene rubber-lithium (molar ratio) | 1.4 | 1.4 | 2.2 | 1.4 | 2.2 | 1.6 | 5.6 | 0 |

The molar ratio of the modifier to the conjugated diene rubber containing alkali metal ions can be seen in Table 1. Modifier 1 is diethyl [2-(triethoxysilyl)ethyl]phosphonate. Modifier 2 is diethyl [3-(triethoxysilyl)propyl]phosphonate. Modifier 3 is (N,N-Dimethylaminopropyl)trimethoxysilane. Modifier 4 is (3-isocyanatopropyl)trimethoxysilane. Modifier 5 is triethylphosphite; and Modifier 6 is (3-glycidyloxypropyl)trimethoxysilane.

The method of making the rubber obtained in each of the above examples of the present invention into the conjugated diene rubber composition and further forming a vulcanized sheet film to test the dynamic loss tangent tan δ 60° C. will be described below.

100 parts by weight of rubber of each of the Examples and Comparative Examples, 70 parts by weight of silica compound (product name: Ultrasil 7000GR, manufactured by EVONIK Corporation), 5.6 parts by weight of silane coupling agent (product name: Si69, manufactured by EVONIK Corporation), 37.5 parts by weight of filling oil (TDAE, manufactured by IRPC or H&R Corporation), 1.0 part by weight of antioxidant (product name: Antage 6C), 2 parts by weight of stearic acid, 3 parts by weight of zinc oxide, 1.5 parts by weight of sulfur, and 3.3 parts by weight of vulcanization accelerator (product name: CZ 1.8 parts by weight and D 1.5 parts by weight) were kneaded to form the respective compositions. The compositions were molded into sheet films by a two-roller machine, and the sheet films were heated to 160° C. for 30 minutes to carry out vulcanization, thereby obtaining test pieces of the vulcanized sheet films. The dynamic loss tangent obtained from the test pieces of Example 1A and Example 1B was determined by the test way A under strain sweep, and the variations of G' and G" of the test pieces were measured to obtain the value of tan δ=G"/G'. The sample temperature during scanning was 60° C., the range of strain sweep was 0.1%~10%, the scanning frequency was 1 Hz, and the strain value of 5.0% was taken. The dynamic loss tangent obtained from the test pieces of Example 2 to Example 10 and Comparative Example 1 to Comparative Example 8 was determined by a test way B from −70° C. to 80° C. under the temperature sweep. The sweep ranges from −70° C. to 30° C. was measured using a strain of 0.2% and the scanning frequency was 1 Hz. The sweep ranges from 30° C. to 80° C. was measured using a strain of 3.0% and the scanning frequency was 1 Hz. The variations of G' and G" of the test piece were measured to obtain the value of tan δ=G"/G' at 60° C. The dynamic loss tangent obtained from the test pieces of the respective examples and comparative examples is shown in Tables 2 and 3.

TABLE 2

| | Example 2 | Example 3 | Comparative Example 1 | Comparative Example 2 | Comparative Example 3 | Comparative Example 4 | Comparative Example 5 |
|---|---|---|---|---|---|---|---|
| Modifier | Modifier 1 | Modifier 1 | Modifier 3 | Modifier 4 | Modifier 4 | Modifier 5 | Modifier 5 |
| Modifier/Conjugated diene rubber-lithium (molar ratio) | 1.4 | 2.2 | 1.4 | 1.4 | 2.2 | 1.4 | 2.2 |
| Initial weight average molecular weight $M_i$ ($10^4$ g/mole) | 26 | 27 | 23 | 25 | 27 | 22 | 37 |
| Coupling Ratio CR % (after stripping and drying) | 64 | 62 | 27 | 70 | 60 | 51 | 15 |
| weight average molecular weight after modification Mw ($10^4$ g/mole) | 51.2 | 52.8 | 53 | 59.2 | 52.3 | 33.4 | 39 |
| Mooney viscosity ML (after stripping and drying) | 76 | 75 | 75 | 72 | 77 | 49 | 73 |
| Glass transition temp. Tg ° C. | −30 | −28 | −27 | −31 | −29 | −28 | −29 |
| Tb × Eb | 6404 | 6998 | 5875 | 6103 | 6286 | 5699 | 6227 |
| Index$_{Tb \times Eb}$ | 109 | 114 | 100 | 104 | 107 | 97 | 106 |
| tan δ 60° C. | 0.101 | 0.095 | 0.105 | 0.103 | 0.103 | 0.121 | 0.112 |
| Index$_{tan\delta}$ 60° C. | 104 | 110 | 100 | 102 | 102 | 86.8 | 93.8 |

TABLE 3

| | Example 4 | Example 5 | Example 6 | Example 7 | Comparative Example 6 | Comparative Example 7 | Comparative Example 8 |
|---|---|---|---|---|---|---|---|
| Modifier | Modifier 1 | Modifier 1 | Modifier 2 | Modifier 2 | Modifier 6 | Modifier 6 | None |
| Modifier/Conjugated diene rubber-lithium (molar ratio) | 1.6 | 5.6 | 1.6 | 5.6 | 1.6 | 5.6 | 0 |
| Initial weight average molecular weight $M_i$ ($10^4$ g/mole) | 25.9 | 23.1 | 27.2 | 23.8 | 25 | 24.5 | 35 |
| Coupling Ratio CR % (after stripping and drying) | 64.4 | 62 | 56.3 | 48.2 | 55.5 | 36.6 | 0 |
| weight average molecular weight after modification Mw ($10^4$ g/mole) | 53.1 | 45.2 | 47.9 | 37.7 | 53.6 | 36.2 | 35 |
| Mooney viscosity ML (after stripping and drying) | 87.7 | 73.5 | 95.6 | 63.1 | 90.4 | 59.9 | 69 |
| Glass transition temp. Tg ° C. | −22 | −23 | −22.5 | −21.4 | −22 | −21 | −24 |
| Tb × Eb | 6421 | 6715 | — | — | 6067 | 6126 | — |
| Index$_{Tb \times Eb}$ | 109 | 114 | — | — | 103 | 104 | — |
| tanδ 60° C. | 0.119 | 0.115 | 0.111 | 0.106 | 0.126 | 0.129 | 0.136 |
| Index$_{tanδ}$ 60° C. | 106 | 110 | 114 | 119 | 100 | 97.7 | 77 |

Although the present invention has been disclosed in the above preferred embodiments, it is not intended to limit the invention, and it is possible for those skilled in the art to make alterations and modifications without departing from the spirit and scope of the invention. The scope of the invention is defined by the appended claims.

What is claimed is:

1. A method for manufacturing a modified rubber, comprising:
step (a): providing a conjugated diene rubber, which is a polymer composed of a conjugated diene monomer or the conjugated diene monomer with a vinyl aromatic monomer, the step (a) comprising utilizing an anionic polymerization to polymerize the conjugated diene monomer or the conjugated diene monomer with the vinyl aromatic monomer using an organic alkali metal compound as an initiator to form a conjugated diene rubber containing alkali metal ions; and
step (b): providing a compound containing silicon and phosphorus to react with the conjugated diene rubber, wherein the compound containing silicon and phosphorus has a structure of formula (1), and the conjugated diene rubber replaces at least one of $A_1$, $A_2$, $A_3$, Y, and Z in the compound containing silicon and phosphorus to form the modified rubber,

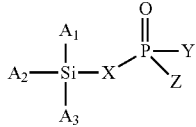

formula (1)

wherein X is selected from a $C_1$-$C_{12}$ alkylene group, a $C_2$-$C_{12}$ alkenylene group, a $C_3$-$C_{12}$ alicyclic group, and a $C_6$-$C_{12}$ aromatic group; and
$A_1$, $A_2$, $A_3$, Y, and Z are each independently selected from an alkyl group, an alkoxy group, and a halide group, and $A_1$, $A_2$, $A_3$, Y, and Z are the same or different from each other, wherein the molar ratio of the compound containing silicon and phosphorus to the conjugated diene rubber containing alkali metal ions is ≥5.0.

2. The method for manufacturing a modified rubber of claim 1, wherein the conjugated diene rubber is a block copolymer.

3. The method for manufacturing a modified rubber of claim 1, wherein the conjugated diene rubber is a non-block copolymer.

4. The method for manufacturing a modified rubber of claim 1, wherein the conjugated diene rubber replaces at least two of $A_1$, $A_2$, $A_3$, Y, and Z in the compound containing silicon and phosphorus to form the modified rubber.

5. The method for manufacturing a modified rubber of claim 1, wherein by a gel permeation chromatography (GPC) measurement the modified rubber is characterized in having m peaks, m is greater than or equal to 1, and the first peak ($M_i$) represents the lowest weight average molecular weight of 5×$10^4$ to 150×$10^4$ g/mole.

6. The method for manufacturing a modified rubber of claim 5, wherein m is greater than 1, the modified rubber has a coupling ratio (CR %) of 10% to 80%, and the coupling ratio (CR %)=[(a total integral area of the m peaks−an integral area of the first peak)/the total integral area of the m peaks]×100%.

7. The method for manufacturing a modified rubber of claim 1, wherein the modified rubber has a weight average molecular weight (Mw) of 15×$10^4$ to 200×$10^4$ g/mole.

* * * * *